United States Patent [19]

Inaba

[11] 4,306,652
[45] Dec. 22, 1981

[54] SEAL FOR A DIAL INDICATOR ON A GAUGE OR THE LIKE

[75] Inventor: Yoshinobu Inaba, Tochigi, Japan

[73] Assignee: Kabushiki Kaisha Mitutoyo Seisakusho, Tokyo, Japan

[21] Appl. No.: 137,957

[22] Filed: Apr. 7, 1980

[30] Foreign Application Priority Data

Apr. 28, 1979 [JP] Japan .............................. 54-58057[U]

[51] Int. Cl.³ ...................... F16J 15/10; B65D 85/38; G01D 11/26
[52] U.S. Cl. ...................................... 206/305; 206/18; 368/291; 277/12; 277/117; 277/214; 73/431
[58] Field of Search .......................... 206/18, 301, 305; 73/431; 368/291, 292; 350/65, 67; 277/115, 116, 117, 118, 12, 214

[56] References Cited

U.S. PATENT DOCUMENTS

| 552,534 | 1/1896 | Leukart et al. ........................ 206/18 |
| 2,288,263 | 6/1942 | Bostwick ........................ 277/118 X |
| 2,737,010 | 3/1956 | Piquerez .............................. 368/291 |
| 3,439,543 | 4/1969 | Aldeborgh .............................. 73/431 |
| 3,505,807 | 4/1970 | Piquerez .............................. 368/291 |
| 3,783,604 | 1/1974 | Florent et al. ................... 368/291 X |
| 3,785,142 | 1/1974 | Soguel .................................. 368/291 |

FOREIGN PATENT DOCUMENTS

| 46-692 | 11/1971 | Japan . |
| 281805 | 7/1952 | Switzerland ........................ 368/291 |
| 400916 | 4/1966 | Switzerland ........................ 368/291 |
| 557055 | 12/1974 | Switzerland ........................ 368/291 |
| 563030 | 6/1975 | Switzerland ........................ 368/291 |

*Primary Examiner*—Robert S. Ward, Jr.
*Attorney, Agent, or Firm*—Quaintance & Murphy

[57] ABSTRACT

An improvement in the combination of a cylindrical outer frame which is coaxially rotatably mounted on the outside of a cylindrical inner frame as disclosed. The improvement which maintains a sealed condition between the two frames includes a first circumferential groove on the outside of the inner frame, this groove having sloped sidewalls. A second circumferential groove is provided on the inside surface of the outer frame opposite the first groove, the second groove having parallel sidewalls. A sealing ring is positioned within the space defined by the first and second grooves and contacts opposing sidewalls of the two grooves. A biasing means is provided for axially biasing the inner and outer frame with respect to each other so as to assure the sealing condition established by the sealing ring.

8 Claims, 2 Drawing Figures

SEAL FOR A DIAL INDICATOR ON A GAUGE OR THE LIKE

BACKGROUND OF THE INVENTION

1. Field of the Invention

The present invention relates to seals between an outer cylindrical frame and an inner cylindrical frame and particularly to seals which permit rotational movement in a dial indicator of a gauge or other similar instrument.

2. Description of Prior Art

In conventional dial indicators for gauges and the like, a cylindrical outer frame is rotatably fitted to the outside of a cylindrical inner frame. A dial plate or face is rotatably supported on its circumference for movement with the cylindrical outer frame such that the pointer of the dial indicator can be set to zero by rotatable movement of the cylindrical outer frame and dial plate or face. In this type of dial indicator, water, oil, or other liquid or gaseous contaminant is liable to get into the inner cylinder through a gap between the outer cylindrical frame and the inner cylindrical frame when the instrument is in use. As a consequence of this, the magnifying gear system within the inner frame may become rusted, or the surface of the dial plate may become stained with oil, or another similar event may occur rendering the instrument unreliable or non-functioning.

To eliminate this drawback, it has been conventional practice to provide a circumferential, rectangular channel or groove on the inner frame. A sealing ring was provided in the annular groove, the sealing ring abutting the flat, inner surface of the outer frame. In this configuration, the sealing ring elasically presses on the inside of the outer frame and the annular groove of the inner frame in a manner well known with the conventional practice of the use of so-called O-rings.

When initially constructed in this fashion, a reliable seal was established between the inner and outer frame which prevented the unwanted invasion of liquids or vapors which might damage the dial indicator. When, however, the sealing ring is worn by the repeated rotation of the outer frame due to zero-setting, the sealing ring will fail to be uniformly pressed against the entire circumference of the outer frame. As a result, a gap between the sealing ring and the outer frame can occur which will permit the invasion of a contaminant into the dial indicator. It is, therefore, the primary object of the present invention to provide an improvement in the combination of a cylindrical outer frame coaxially rotatably mounted on the outside of a cylindrical inner frame which will maintain a sealed condition therebetween.

SUMMARY OF THE INVENTION

The present invention is an improvement in the combination of a cylindrical outer frame coaxially rotatably mounted on the outside of a cylindrical inner frame, which will maintain a sealed condition therebetween for an extended period of time not previously achievable. In the invention, a first circumferential groove is provided on the outside of the inner frame, this first groove having sloped sidewalls. The second circumferential groove is provided on the inside of the outer frame opposite the first groove, the second groove having parallel sidewalls. A sealing ring is positioned within the space defined by the first and second grooves. A biasing means is provided for axially biasing the inner and outer frames with respect to each other such that the sealing ring is pressed against opposite side surfaces of the first and second circumferential grooves, thereby providing a durable seal between the inner and outer frames.

The first circumferential groove having the sloped sidewalls may have a V-shape, U-shape, or other similar cross-section which will provide for the sloping wall necessary for proper functioning of the sealing ring. Preferably the depth of the second groove on the inside of the outer frame is substantially equal to or greater than the cross-sectional diameter of the sealing ring, thereby permitting the sealing ring to be substantially completely received within the second circumferential groove during assembly. This feature has the advantage of permiting the sealing ring to also function as a retaining ring for retaining the outer cylindrical frame with respect to the inner cylindrical frame following assembly.

To further provide ease in assembly, the improvement of the present invention also include a circumferential inclinded guide surface provided at an end of the inner frame to facilitate the fitting of the outer frame over the inner frame. The guide surface acts to radially expand the sealing ring from its normal unextended condition to the maximum diameter of the inner frame as the outer frame is pushed in the axial direction of the inner frame during initial assembly.

An advantage of the present invention is that the frictional forces exerted on the sealing ring during the rotational adjustment of the outer frame with respect to the inner frame, during zero-setting or the like, can be minimized by axially displacing the outer frame with respect to the inner frame against the biasing means. This has the concommitent advantage of reducing the wear on the sealing ring, thereby permitting the sealing ring to satisfactorily function for a longer period of time before replacement is necessary.

Other features and many of the intended advantages of the present invention will be readily appreciated as the same becomes better understood by reference to the following detailed description of a preferred embodiment of the invention when considered in connection with the accompanying drawings.

DESCRIPTION OF A PREFERRED EMBODIMENT

Figure 1:
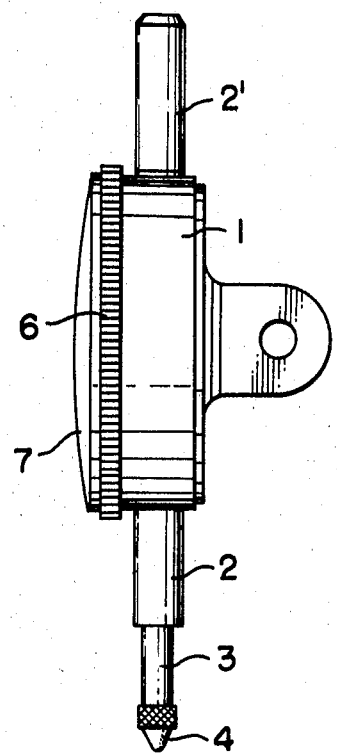
FIG. 1 is a side view of a dial indicator gauge in which the present invention can be employed.

A dial indicator gauge is illustrated in FIG. 1. The dial indicator gauge comprises a cylindrical inner frame 1 which contains a magnifying gear system (not shown). Stems 2 and 2' are fixed to the inner frame 1. A spindle 3 is slidably fitted within stems 2 and 2', traverses through the inner frame 1, and engages the magnifying gear system referred to previously. A work piece contact point 4 is integrally provided at the tip of spindle 3 for contacting a work piece sought to be measured with the aid of the gauge.

An outer frame 6 is rotatably fitted to the inner frame 1, the outer frame 6 carrying a cover 7 conventionally composed of transparent glass or transparent synthetic resin. A circular dial plate 8 (illustrated in FIG. 2) is fitted to the inside 6a of the outer frame 6 for rotation therewith. A pointer (not shown) is engaged by the magnifying gear system discussed above, the pointer being movable with respect to the dial plate 8 in response to a displacement of spindle 3 with respect to cylindrical inner frame 1. On the surface of the dial plate 8 facing the cover 7, there is provided a scale to which the pointer points. Dial indicating gauges are conventionally used by initially contacting a workpiece with the contact 4, moving the outer frame 6 with respect to inner frame 1 such that the pointer points at a selected point on the scale of the circular dial 8 such as zero. The workpiece is then moved to a second location and the indication of the displacement observed on the gauge dial.

Figure 2:
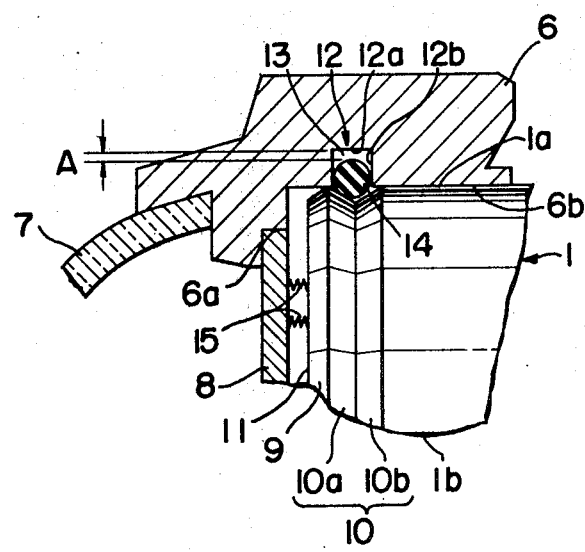
FIG. 2 is a partial, sectional view of the gauge illustrated in FIG. 1 illustrating, in detail, the various features of the present invention as applied to such a gauge dial indicator.

In the present invention, at an end 1b of the inner frame 1, an inclined guide surface 9 and an annular groove 10 having sloped sidewalls 10a and 10b are provided. The guide surface 9 and the annular groove 10 can be contiguous as illustrated in FIG. 2 or they can be separated by a narrow cylindrical section. The guide surface 9 and the annular groove 10 circumferentially encompass the inner frame 1. The guide surface 9 extends from the edge 11 at end 1b of the inner frame 1 to an outside diameter 1a, its width being greater than the normal beveling width. The annular groove 10 is illustrated to be composed of two inclined planes 10a and 10b, but the profile of the annular groove 10 may be of any profile, so long as the sidewalls are sloped. In particular, it may be U-shaped or V-shaped, and when shaped as illustrated, the inclinations of 10a and 10b need not necessarily be equal.

An annular groove 12 is circumferentially disposed on the inside 6b of the outer frame 6. The groove 12 has parallel sidewalls so as to form a rectangularly shaped channel. The position of the annular groove 12 is such that it faces the annular groove 10 when the outer frame 6 is fitted to the inner frame 1. An annular space 13 is thus formed by the two annular grooves 10 and 12.

A sealing ring 14 is positioned within the annular space 13. The sealing ring 14 is selected of such a dimension that it occupies at least part of the space provided by each of the annular grooves 10 and 12. The sealing ring 14 preferably consists essentially of a rubber such as Neoprene Rubber, Nitrile Rubber or Silicone Rubber. The sealing ring 14 is selected of such a dimension that before assembling frame 6 onto frame 1, the sealing ring 14 is held within the annular groove 12 without slipping out of that groove. After co-assembly of the frames, the sealing ring 14, by virtue of its own resilience, lightly presses itself against the inclined surfaces 10a and 10b of the annular groove 10 and leaves an annular gap A between itself and the bottom 12a of annular groove 12.

Between the edge 11 of the inner frame 1 and the dial plate 8, there is inserted a biasing means 15. This biasing means 15 acts to bias outer frame 6 away from inner frame 1 in the axial direction. Thus, the sealing ring 14 is closely pressed against the inclined surface 10a of annular groove 10 and the side surface 12b of annular groove 12.

In the assembly of an indicating dial gauge or other similar device constructed according to the present invention, the sealing ring 14 is first fitted into the annular groove 12 of the outer frame 6. End 1a of the inner frame 1 is then pushed into the outer frame 6, the sealing ring 14 coming into contact with the guide surface 9. A further thrust of the inner frame 1 into the outer frame 6 causes the sealing ring 14 to widen in diameter and slide along the guide surface 9, a part of the sealing ring, as it is widened, being absorbed into the space A. A further thrust of the inner frame 1 into the outer frame 6 causes a contact between the inside surface 6a of frame 6 and dial face 8, which in turn acts on biasing means 15 placed between the edge 11 of the inner frame 1 and the dial plate 8. Concurrently, the sealing ring 14 contracts due to its elastic nature into groove 10.

Once the outer frame 6 and inner frame 1 are thus fitted together, they are retained in this configuration by the presence of the sealing ring 14 acting on the sides of the annular grooves 10 and 12. The sealing ring 14 presses greatly against the inclined surface 10a of the annular groove 10 and the side surface 12b of the annular groove 12 by the action of the biasing means 15. Thus, the outer frame 6 is frictionally fitted to the inner frame 1 in a sealed state, yet with the possibility of relative rotation between frames 1 and 6. Even when the sealing ring is somewhat worn due to age or the like, the biasing means 15 insures the continuous contact of the sealing ring 14 against the entire inclined surface 10a and the entire side surface 12b thereby sealing the interior of the dial indicator from contamination.

In the illustrated embodiment, the biasing means 15 is merely schematically indicated between the edge 11 of inner frame 1 and the dial plate 8. The biasing means 15 can be a coil spring, a leaf spring, a wave washer spring, a dish-shaped Belleville spring or an elastic material like rubber so long as it permits the axially displacement of the inner frame 1 with respect to the outer frame 6 and biases them away from each other.

In this invention, as explained, a sealing ring inserted across the annular groove 10 formed on the outside of the inner frame 1 and the annular groove 12 formed on the inside of the outer frame 6 can prevent the separation of the inner frame 1 from the outer frame 6. Moreover, the sealing provided between the inner frame 1 and the outer frame 6 by the sealing ring 14 can reliably prevent infiltration of water, oil, or other contaminant into the inner frame 1. Zero setting can easily be affected by pushing the outer frame 6 against the urging of the biasing means 15 thereby weakening or releasing the engagement of the ring 14 with the side surfaces 12b and 10a, and rotating the frame 6 relative to the frame 1.

Furthermore, since the section of the annular groove on the inner frame is designed to have sloping sidewalls 10a and 10b, and the outer frame and inner frame are biased axially with respect to each other, the outer frame and inner frame have an increased frictional force existing between the two thereby reducing the possibility of an accidental change in the zero set during use of the gauge itself. This increase in frictional engagement is achieved by the presence of the inclined surface on the annular groove 10 on the inner frame 1 and the side surface 12b of the annular groove 12 on the outer frame 6. Thus, even when the sealing ring 14 is worn to such an extent that in the conventional device the sealability would be deteriorated, the sealing between the inner frame and outer frame in the present invention can still be maintained.

Since the annular groove 12 on the outer frame has a rectangular cross-section while the annular groove on the inner frame has sloping sidewalls, a gap is provided between the sealing ring and the bottom of groove 12 such that a widened diameter of the sealing ring can easily be absorbed during initial assembly. The diameter of the sealing ring can be radially widened and expanded in the circumferential direction without causing any permanent deformation in the sealing ring so long as the dimensions chosen are within the elastic limits of the material selected to comprise the sealing ring 14. Thus, with the appropriate selection of dimensions and materials, there is virtually no possibility of the sealing ring being broken when the inner frame and outer frame are initially assembled together.

While this disclosure of a preferred embodiment of the invention is directed to an indicating dial on a gauge, it will be appreciated that the invention is applicable to any instrument in which an outer frame has to be rotatably fitted in a sealed condition to the outside of an inner frame in a coaxial manner. Other variations and modifications of the present invention will become apparent to those having ordinary skill in the art to which the invention pertains, the invention being defined by the appended claims.

What is claimed:

1. An improvement in the combination of a cylindrical outer frame coaxially rotatably mounted on the outside of a cylindrical inner frame for maintaining a sealed condition therebetween, the improvement comprising:
   a first circumferential groove on the outside of the inner frame, the first groove having sloped sidewalls;
   a second circumferential groove on the inside of the outer frame opposite the first groove, the second groove having parallel sidewalls;
   a sealing ring positioned within the space defined by the first and second grooves; and
   a biasing means for axially biasing the inner and outer frame with respect to each other.

2. The improvement of claim 1 wherein the first groove is V-shaped.

3. The improvement of claim 1 wherein the second groove is a rectangular channel.

4. The improvement of claim 3 wherein the depth of the second groove is substantially equal to or greater than the cross-sectional diameter of the sealing ring.

5. The improvement of claim 1 further comprising a circumferential inclined guide surface provided at an end of the inner frame to facilitate the fitting of the outer frame to the inner frame.

6. The improvement of claim 5 wherein the guide surface and the first circumferential groove are contiguous.

7. The improvement of claim 1 wherein the sealing ring consists essentially of rubber.

8. In an indicating dial of a gauge comprising an outer cylindrical frame carrying a transparent cover, an inner cylindrical frame coaxially rotatably mounted within the outer frame, an improvement for maintaining a sealed condition between the inner and outer frame comprising
   a first circumferential groove on the outside of the inner frame, the first groove having sloped sidewalls;
   a second circumferential groove of rectangular cross-section on the inside of the outer frame opposite the first groove;
   a sealing ring positioned within the space defined by the first and second grooves; and
   a biasing means for axially biasing the inner and outer frame with respect to each other such that the sealing ring is pressed against a side surface of the first annular groove and a side surface of the second annular groove thereby sealing the inner frame against the outer frame.

* * * * *